(No Model.)

A. B. HENDRYX.
BIRD CAGE.

No. 346,283.　　　　　　　　Patented July 27, 1886.

Witnesses.　　　　　　　　Andrew B. Hendryx.
　　　　　　　　　　　　　　　Inventor.
　　　　　　　　　　　　By Atty

United States Patent Office.

ANDREW B. HENDRYX, OF NEW HAVEN, CONNECTICUT.

BIRD-CAGE.

SPECIFICATION forming part of Letters Patent No. 346,283, dated July 27, 1886.

Application filed November 23, 1885. Serial No. 183,601. (No model.)

*To all whom it may concern:*

Be it known that I, ANDREW B. HENDRYX, of New Haven, in the county of New Haven and State of Connecticut, have invented a new Improvement in Bird-Cages; and I do hereby declare the following, when taken in connection with accompanying drawings and the letters of reference marked thereon, to be a full, clear, and exact description of the same, and which said drawings constitute part of this specification, and represent, in—

Figure 1:
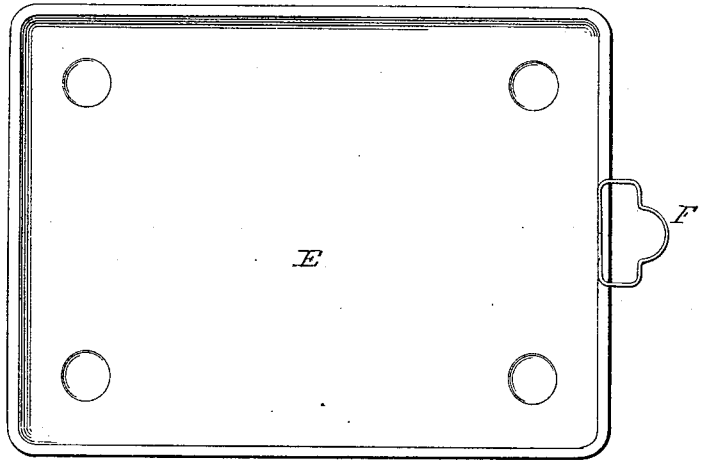
Figure 2:
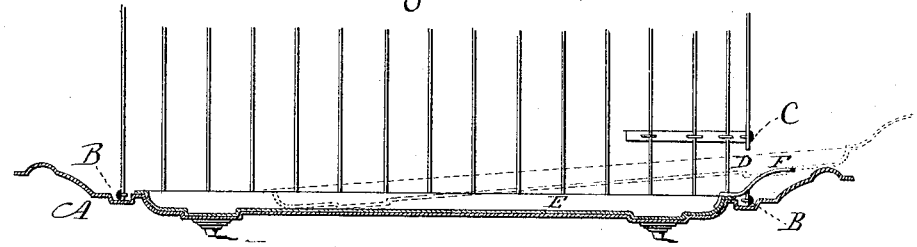
Figure 3:
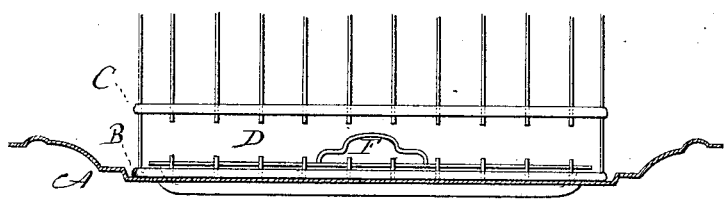

Figure 1, a top view of the pan; Fig. 2, a vertical central section through the base and wire portion of the cage, the upper part of the cage omitted in the illustration; Fig. 3, a transverse section through the base outside the opening D, showing the side of the frame in which the opening D is made.

This invention relates to an improvement in that class of bird-cages which consist of a metal pan-like base, and to which the wire frame is attached by bolts or clips, so that the base may be removable from the frame.

In cleansing this class of cages it is customary to detach the base from the frame and lift the frame, with the bird, from the base, and then, after cleansing, replace the frame upon the base. The inconvenience of thus cleansing the frame is very great, and in so doing the cage is open to such an extent that the bird is liable to escape.

The object of my invention is to provide a means for cleansing the cage without detaching the frame from the base; and it consists in constructing the frame with an additional rail near the lower rail of the frame and parallel therewith, with the wires between the two cut away, combined with a pan adapted to be introduced or removed through the space thus cut away, all as more fully hereinafter described.

A represents the base, which is of usual form, having a projecting rim around its edge outside the cage proper. The bottom of the base is depressed, the depression, as shown, corresponding in shape, substantially, to the interior of the cage, but somewhat smaller; B, the lower rail of the frame, the frame and base secured together in the usual manner, but preferably so that the base may be detached should occasion require. At one side of the frame an additional rail, C, is introduced, parallel with the rail B, and the wires between the rails B and C are cut off or omitted, as seen in Fig. 3, leaving a narrow opening, D, across that side of the frame.

E is a pan corresponding to the interior of the cage, and adapted to rest in the recess in the base within the frame, and is provided at the side corresponding to the opening D in the frame with a suitable handle, F, which may project through the opening D, as indicated in Fig. 2. When fully introduced, it sets in the recess in the base, leaving the handle projecting as a convenient means for removing the pan. Whenever it is desired to clean the cage, the pan is withdrawn, as indicated in broken lines, Fig. 2, it readily passing over the rim of the base through the opening D, and when the pan is cleansed it may be in like manner replaced. By this construction the cage is readily cleaned without removing it from its suspended position, and without liability of the escape of the bird; and by this construction the base may be made a permanent and detachable part of the frame, thereby avoiding many accidents which occur in this class of cages.

I do not wish to be understood as claiming, broadly, a bird-cage constructed with the pan removable therefrom, as such, I am aware, is not new; but I am not aware of a cage in which the base has been constructed with a depression corresponding to the shape of the frame of the cage, and the frame constructed with an opening above the base, combined with a pan adapted to be set through said opening in the frame into the recess in the base, which construction constitutes essential features of my invention.

I claim—

In a bird-cage, the combination of a metal base constructed with a depression to form a recessed bottom, and a wire frame constructed with a bottom rail, B, to rest upon said base, and at one side with a rail, C, above and parallel with the bottom rail, the wires between said rails being omitted to form an opening, D, across the side of the frame, with a pan, E, corresponding in shape to the depression in the base of the case, and adapted to be introduced through said opening and rest in said depression, substantially as described.

ANDREW B. HENDRYX.

Witnesses:
EDWARD N. PECK,
L. S. ALGER.